United States Patent [19]

Kim et al.

[11] Patent Number: 5,963,705
[45] Date of Patent: *Oct. 5, 1999

[54] DISK DETECTING DEVICE AND METHOD

[75] Inventors: Young-Han Kim, Suwon; Young-Gi Byun, Gunpto; Myoung-Jong Song, Suwon, all of Rep. of Korea

[73] Assignee: Samsung Electronics Co., Ltd., Suwon, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/729,687

[22] Filed: Oct. 7, 1996

[51] Int. Cl.⁶ .............................. H04N 5/781; H04N 5/85
[52] U.S. Cl. ............................................ 386/126; 386/125
[58] Field of Search .................................. 386/126, 125, 386/105, 106, 117, 118, 82, 107, 46; 360/32; H04N 5/781, 5/85

[56] References Cited

U.S. PATENT DOCUMENTS

| | | | |
|---|---|---|---|
| 4,724,492 | 2/1988 | Kosaka et al. | 386/126 |
| 4,773,052 | 9/1988 | Sugiura et al. | 386/126 |
| 5,522,575 | 6/1996 | Okamoto | 386/126 |

*Primary Examiner*—Robert Chevalier
*Attorney, Agent, or Firm*—Staas & Halsey

[57] ABSTRACT

An optical disk reproducing apparatus having playback systems of CD and DVD containing their respective sync signals and method thereof. The playback systems respectively have sync detectors, and a controller analyzes a sync signal output from the sync detectors when a disk is detected to be mounted. The CD playback system is selectively driven when a CD sync signal is detected to perform a CD playback mode, and the DVD playback system is selectively driven when a DVD sync signal is detected to perform a DVD playback mode.

14 Claims, 14 Drawing Sheets

DISK DETECTING DEVICE AND METHOD

BACKGROUND OF THE INVENTION

1. Field of the Invention

The present invention relates to a disk reproducing apparatus and method and, more particularly, to a device and method of automatically detecting the kinds of disk mounted in an apparatus for reproducing a plurality of kinds of disks.

Generally, one representative type of optical disk performing non-contact reading by using a laser beam is a compact disk (hereinafter, referred to as a CD). However, for the disk recording/reproducing apparatus, higher speed, overwriting and higher density (larger capacity) are increasingly required. Meanwhile, for the digital video compression technology, MPEG (Moving Picture Experts Group) has become more practical in use. Accordingly, digital moving picture disk media like a digital video disk (DVD) will emerge as the core media of multimedia storage.

2. Description of the Related Art

FIG. 1 is a block diagram of a conventional DVD player. In this figure, disk 20 is a high-density optical disk, which can be DVD in this case. Pickup unit 111 is a shortwave optical head. It is assumed that the numerical aperture be 0.6, and that the red semiconductor laser wavelength be used. Signal amplifier 112 amplifies a light signal output from pickup unit 111 after converting it into an electrical signal. Demodulator/ECC decoder 113 demodulates the modulated signal output from signal amplifier 112, and corrects the error produced during playback. Servo controller 114 receives the output (focusing&tracking error signal) of signal amplifier 112 and the output (constant linear velocity control signal) of demodulator/ECC decoder 113 in order to control pickup unit 111. System decoder 116 decodes the DVD data stream output from demodulator/ECC decoder 113, the stream being divided into a video (elementary) data stream and a audio (elementary) data stream. Video decoder 117 decodes the video data stream output from system decoder 116 so that it is converted into the form of reproducible video data. Encoder 118 encodes the video data output from video decoder 117 into a corresponding video displaying mode (NTSC or PAL), and then outputs them to a display. Audio decoder 119 converts the audio data stream encoded and output from system decoder 116 into the original data. D/A converter 120 converts the data output from audio decoder 119 into an analog audio signal. In FIG. 1 the system controller for controlling the overall operation of the disk reproducing apparatus is not shown.

The DVD player constructed as above uses modulation, error correction and a video encoding different from those of a general CD player so that their signal processings are completely different. The pit size and track pitch of a DVD and a CD are different, and their pickup unit 111 laser wavelength and the numerical aperture of the objective lens are different.

In the DVD recording/reproducing apparatus, it is important to reduce the size of a focusing spot for the purpose of higher density. For this, firstly, the laser wavelength becomes shorter, secondly, the objective lens' numerical aperture becomes larger, and thirdly, a modulation having an excellent encoding efficiency is used. Here, for a DVD laser wavelength is 650–635 nm of a red semiconductor laser, the objective lens' numerical aperture is 0.6, and EFM-plus (Eight to Fourteen Modulation plus) is used for modulation.

In order to reproduce information from the high-density optical disk, pickup unit 111 should be able to form a small focusing spot. The diameter of the focusing spot is proportional to the wavelength λ of light, and inversely proportional to the objective lens' numerical aperture, as shown in FIG. 2. At present, the lower limit of the semiconductor laser wavelength is about 635 nm, as described above. Generally speaking, the DVD uses a laser wavelength of 650 nm as its standard, and the CD uses a laser wavelength of 780 nm. The DVD's numerical aperture is 0.6, and the CD's is 0.45 so that the DVD's diameter of focusing spot becomes over about 60% of the CD's. Therefore, the DVD can obtain a playback signal equal to the CD's at about 2.6 times the recording density of the CD. The DVD improves the waveform of the playback signal through the actual circuit processing so that it has a recording density about 4.2 times the CD's.

FIG. 3 shows the relationship between pits and optical focus with respect to a DVD and CD. FIG. 3 shows various dimensions of and area ratios between the DVD and the CD.

The characteristics of a DVD and a CD are shown in the following table 1.

TABLE 1

|  | CD | DVD | REMARKS |
| --- | --- | --- | --- |
| DISK DIAMETER | 120 nm | 120 nm | DVD is a both-sided multi-layer. In case of single-sided single layer |
| DISK THICKNESS | 1.2 nm | 0.6 nm | |
| RECORDING CAPACITY | 640 Mbyte | 4.7 Gbyte | |
| LASER WAVELENGTH | 780 nm | 650 nm | |
| OBJECTIVE'S NUMERICAL APERTURE | 0.45 | 0.6 | |
| MINIMUM PIT SIZE | 0.9 μM | 0.4 μM | |
| TRACK PITCH | 1.6 μM | 0.74 μM | |
| MODULATION MODE | EFM | EFM-plus | |
| ERROR CORRECTING MODE | CIRC | RS-PC | |

In the table 1, the CD and DVD of the same disk diameter have many differences. However, their compatibility is very important because the CD format has an enormous amount of soft resources. The primary impedance in the compatibility between a DVD and a CD is to use a separate optical pickup. In other words, in order to reproduce information on a disk, part of the optical system is formed according to the thickness of disk. For this reason, the objective lens is designed in accordance with the thickness of disk. If the thickness of the disk deviates from the value designed, spherical aberration is produced, and the convergence of optical focus is decreased. More specifically, a DVD is 0.6 mm-thick, whereas a CD is 1.2 mm-thick so that the two kinds of disks cannot be reproduced with a single pickup unit. For their compatibility, separate optical pickup units must be used.

In order to overcome such a problem, a double-focus optical unit was suggested for both a CD and a DVD. In the optical pickup unit shown in FIG. 4, the optical focus for a DVD and the optical focus for a CD are formed spaced apart by a predetermined distance in the direction of an optical axis. This solves the problem caused by the difference of thickness of disk. The principle of the double-focus optical pickup shown in FIG. 4 is to overlap the operations of two kinds of lenses by using a hologram. The numerical aperture of the objective lens of the optical pickup is 0.6 in accordance with the standards of a DVD, and a hologram is provided to diffract part of its central light as if a lens refracts it. The light not diffracted by the hologram is converged by the objective lens whose numerical aperture is 0.6, to thereby form the optical focus of a DVD. The diffracted light forms a hologram to be suitable for 0.4 numerical aperture of the hologram and objective lens and 1.2 mm-thick CD.

In case of the optical pickup shown in FIG. 4, the optical focus for a CD is formed farther than that for a DVD. Here, the photodetector is disposed so that the reflection image of the optical focus converged on the disk is formed thereon. If the DVD is reproduced, the optical focus of the DVD is converged on the disk, and the optical focus for the CD deviates so that the image becomes unclear. The image of the optical focus for the DVD is formed on the photodetector but the reflection light at the optical focus for the CD is scattered widely to give no external impacts in DVD's playback. The reverse operation is performed in CD's playback.

In case of a system having a pickup capable of reproducing both DVD and CD or pickups capable of independently reproducing DVD and CD, it should be operated in a corresponding mode by detecting the kind of disk inserted. The discrimination of DVD and CD can be implemented in various ways: to compare the sizes of the focus error detection signals reproduced by the optical pickup; or to compare the sizes of RF signals in accordance with the pit size.

However, the aforesaid method has the disadvantages that a long time is required to make a distinction between a CD and a DVD, and accuracy is deteriorated.

SUMMARY OF THE INVENTION

In order to overcome such disadvantages of the prior art, it is an object of the present invention to provide a device and method of automatically detecting the kinds of disks mounted in a system for reproducing multiple kinds of disks.

It is another object of the present invention to provide a device and method of detecting and analyzing the sync pattern of a mounted disk after a CD mode is set initially in a system for reproducing a DVD and a CD, to thereby detect the kind of the disk mounted and also automatically performing the corresponding disk reproducing mode according to the discrimination result.

It is still another object of the present invention to provide a device and method of detecting and analyzing the sync pattern of a mounted disk after a DVD mode is set initially in a system for reproducing a DVD and a CD, to thereby detect the kind of the disk mounted and also automatically performing the corresponding disk reproducing mode according to the discrimination result.

It is a further object of the present invention to provide a device and method of detecting and analyzing the sync pattern of a mounted disk in a disk reproducing system having CD and DVD sync detectors, to thereby detect the kind of the disk mounted and also automatically performing the corresponding disk reproducing mode according to the discrimination result.

To accomplish the above and other objects of the present invention, there is provided an optical disk reproducing apparatus having playback systems of CD and DVD containing their respective sync signals, the CD and DVD playback systems respectively having sync detectors, the systems analyzing a sync signal output from the sync detectors when a disk is detected to be mounted, the CD playback system being selectively driven when a CD sync signal is detected to perform a CD playback mode, the DVD playback system being selectively driven when a DVD sync signal is detected to perform a DVD playback mode.

In another aspect of the present invention, there is provided an optical disk reproducing apparatus having playback systems of CD and DVD containing their respective sync signals, the CD playback system having a CD sync detector, the system analyzing whether a CD sync signal output from the CD sync detector is detected or not when a disk is detected to be mounted, the CD playback system being selectively driven when the CD sync signal is detected to perform a CD playback mode, the DVD playback system being selectively driven when the CD sync signal is not detected for a predetermined time to perform a DVD playback mode.

In still another aspect of the present invention, there is provided an optical disk reproducing apparatus having playback systems of CD and DVD containing their respective sync signals, the DVD playback system having a DVD sync detector, the system analyzing whether a DVD sync signal output from the DVD sync detector is detected or not when a disk is detected to be mounted, the DVD playback system being selectively driven when the DVD sync signal is detected to perform a DVD playback mode, the CD playback system being selectively driven when the DVD sync signal is not detected for a predetermined time to perform a CD playback mode.

DESCRIPTION OF THE PREFERRED EMBODIMENTS

Figure 5:
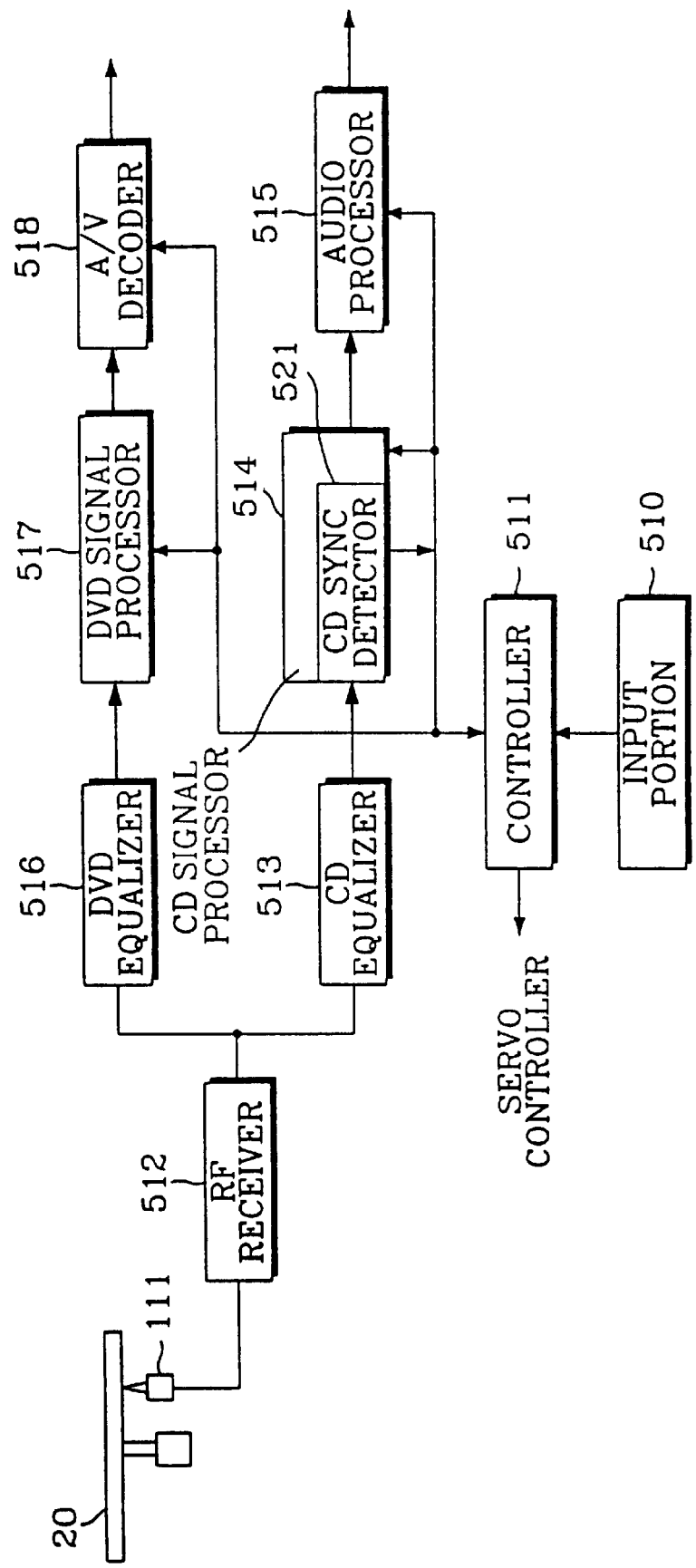
FIG. 5 is a block diagram of a device for detecting the kind of disk mounted in a disk player according to a first embodiment of the present invention.

FIG. 5 shows a configuration of a device for automatically detecting the kinds of disks mounted in the disk recording/reproducing system having CD and DVD reproducing systems according to a first embodiment of the present invention. It is assumed that optical pickup 111 uses a CD/DVD optical pickup unit. Radio frequency (RF) receiver 512 amplifies a weak light signal reproduced from optical pickup 111. Here, the RF signal output from RF receiver 512 is a signal reproduced from the CD or DVD (disk 20).

Figure 1:
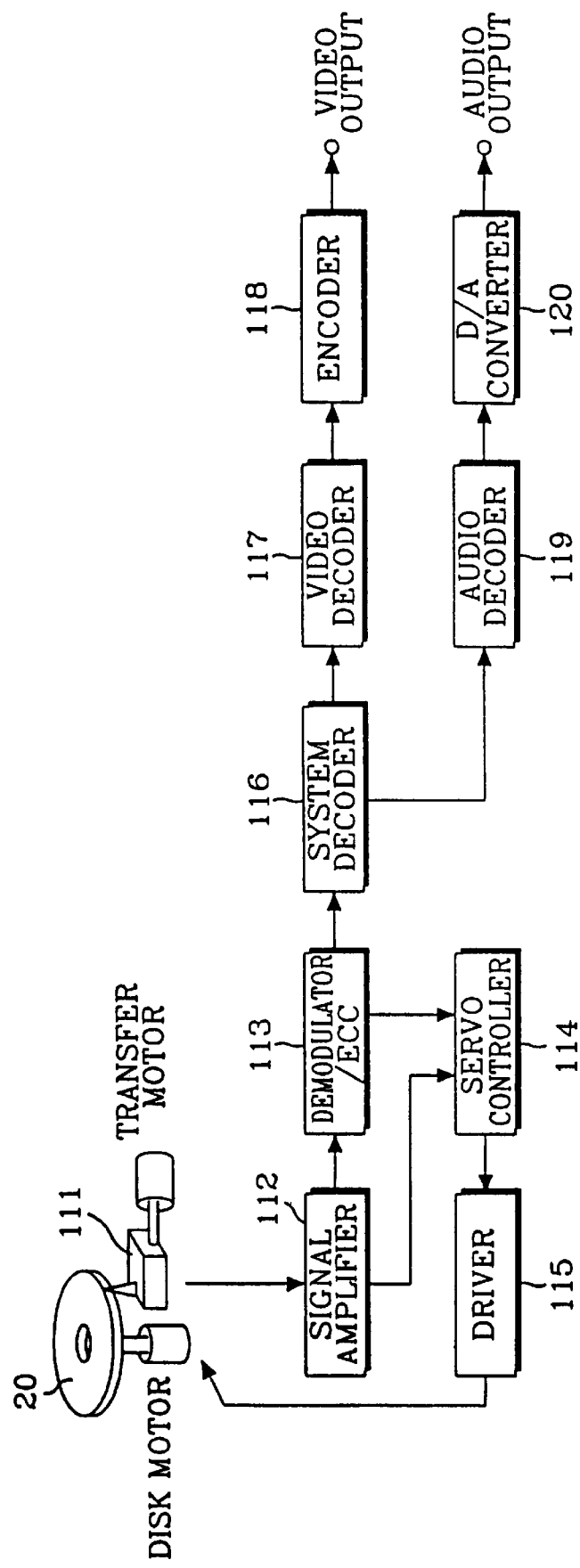
FIG. 1 is a block diagram of a conventional digital video disk reproducing apparatus.
Figure 2:
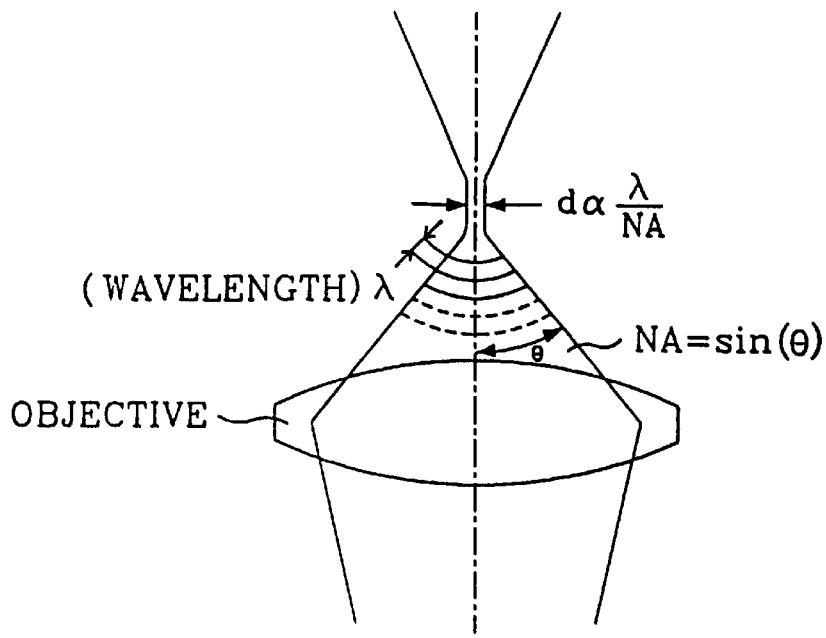
FIG. 2 is a diagram for explaining the relationship among the wavelength of light, the numerical aperture of the objective lens, and the diameter of the optical focus in the digital reproducing apparatus.
Figure 3:
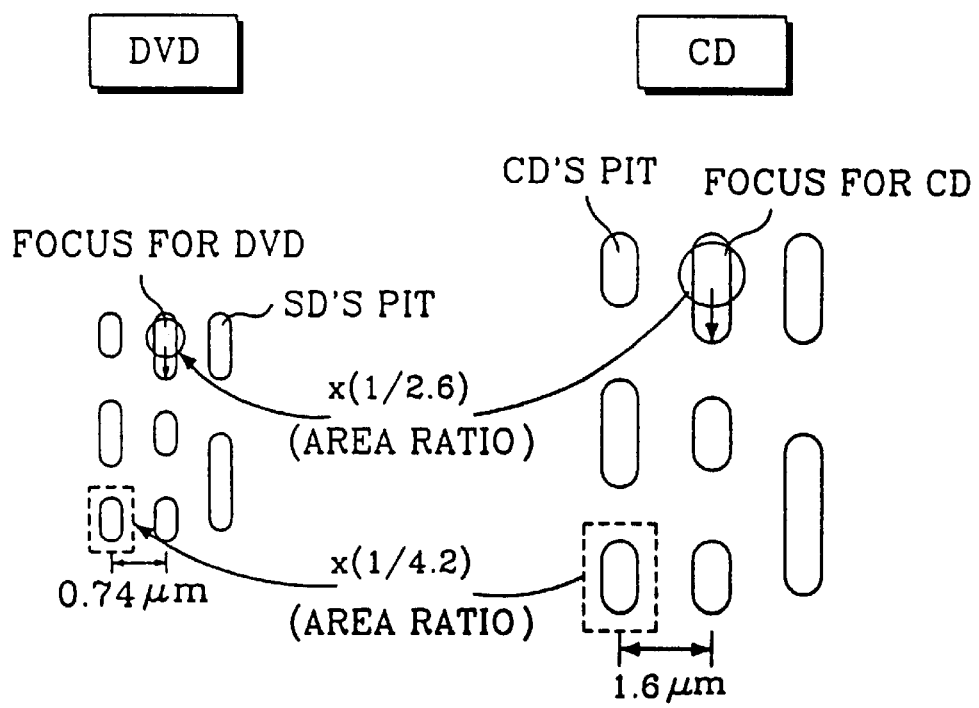
FIG. 3 is a diagram explaining the relationship between pits and optical focus with respect to a video disk and a compact disk.
Figure 4:
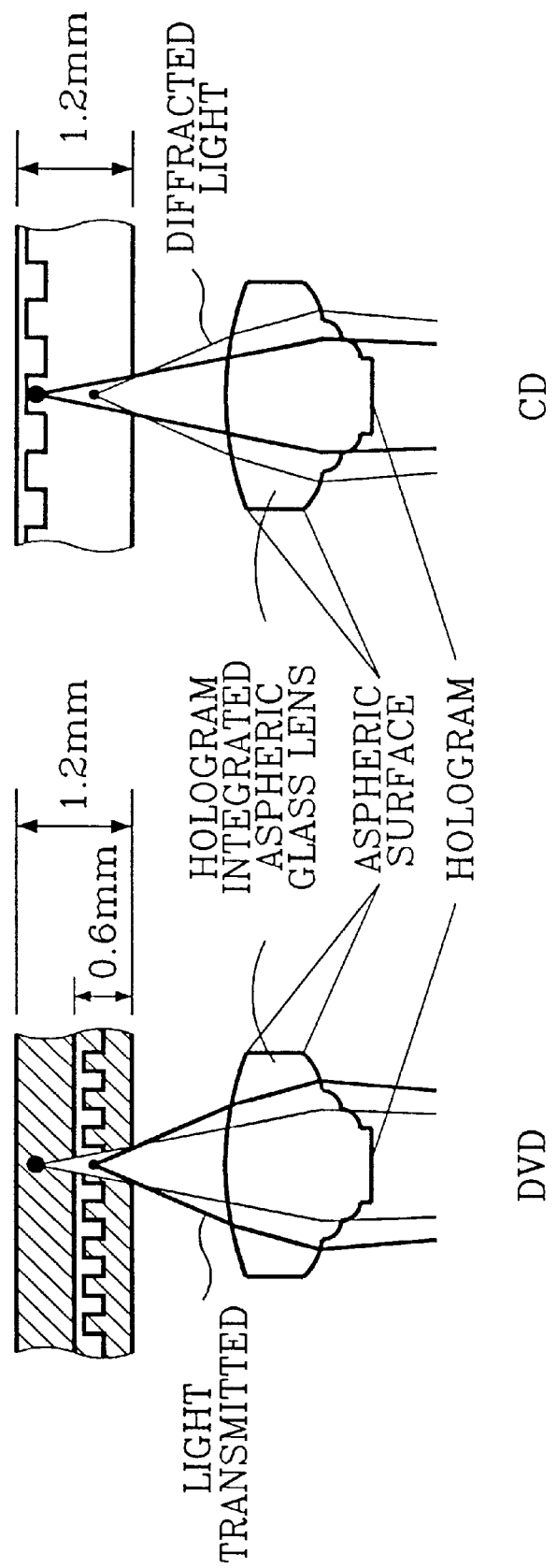
FIG. 4 is a diagram for explaining the principle of a conventional double-focus optical pickup.

First, in the DVD reproducing system, DVD equalizer 516 filters the DVD band of the RF signal received, and equalizes it. Here, the DVD band becomes a wide band containing the CD band. DVD signal processor (digital signal processor) 517 receives the DVD band of data stream output from DVD equalizer 516 to thereby demodulate the modulated data and correct errors produced during the above procedure. DVD signal processor 517 corresponds to demodulator/ECC corrector 113 shown in FIG. 1. A/V decoder 518 splits the data output from DVD signal processor 517 into video data and audio data, and signal processes them. A/V decoder 518 corresponds to system decoder 116, video decoder 117 and audio decoder 119.

Secondly, in the CD reproducing system, CD equalizer 513 filters the CD band of the RF signal output from RF receiver 512, and equalizes it. CD signal processor (digital signal processor) 514 demodulates the modulated data stream output from CD equalizer 513, and corrects errors produced during the above procedure. Audio signal processor 515 signal processes the data output from CD signal processor 514.

This first embodiment of the disk reproducing apparatus has CD and DVD reproducing systems. Optical pickup 111 is a unit capable of reproducing both a CD and a DVD. If a disk is mounted on the disk reproducing apparatus, it should be determined whether the disk mounted is a CD or a DVD, and then a corresponding reproducing system should be selectively driven. For this, CD sync detector 521 is incorporated in CD signal processor 514. Controller 511 decides the kind of the disk mounted and selectively drives a corresponding reproducing system, depending upon whether the CD frame sync pattern output from CD sync detector 521 is detected or not.

Figure 6:
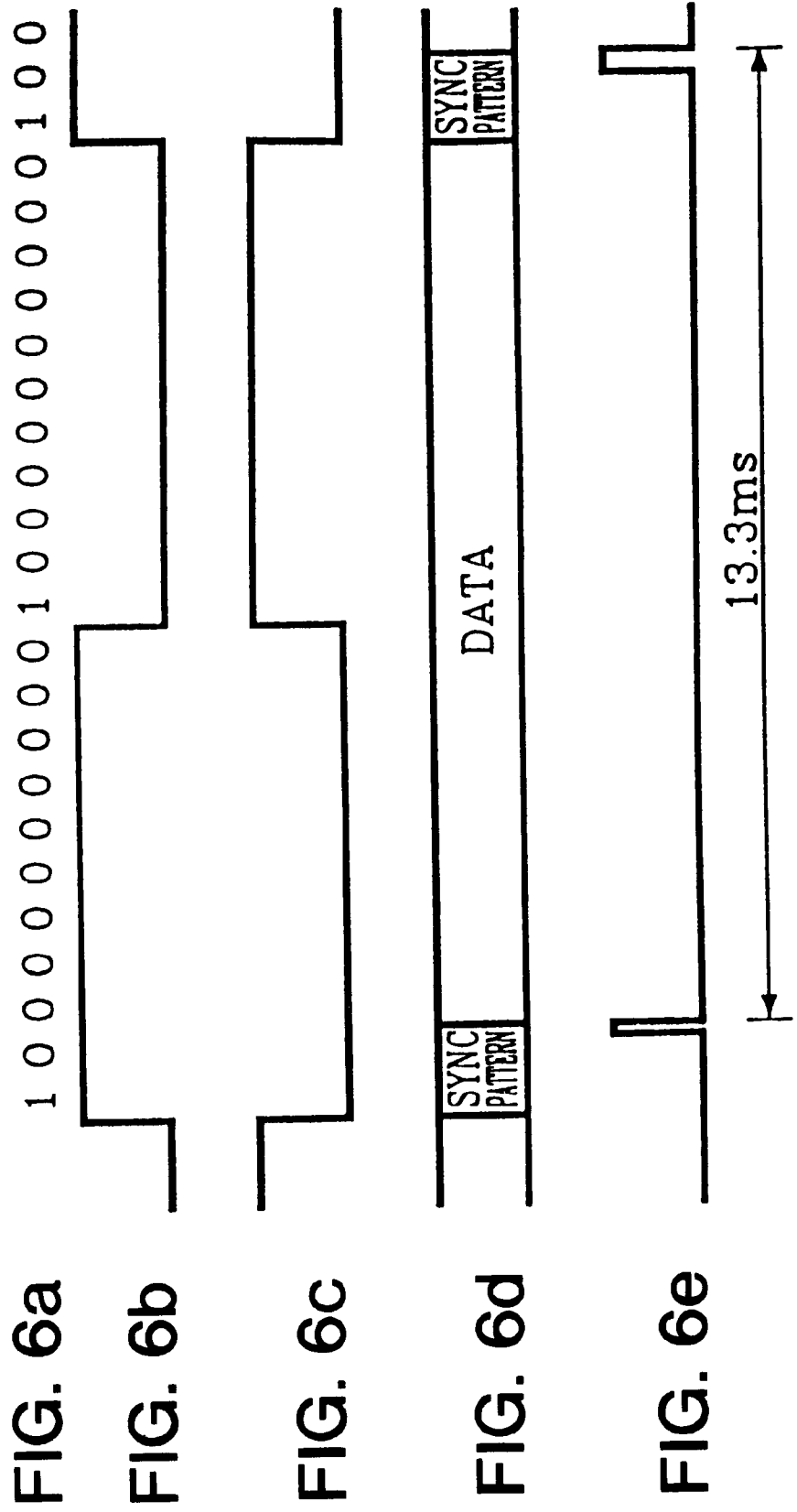
FIGS. 6A–6E show the characteristics of detecting a CD frame sync signal in order to detect the kind of disk according to the first embodiment.

For the frame sync pattern of a CD a pattern not produced from the modulated data is used. This ensures reliable synchronization unless bit errors are produced. The data recorded on a CD uses EFM modulation. According to the EFM modulation, eight bits of data are converted into 14 bits, and pattern combination of minimum three bits 3T and a maximum 11 bits 11T is enabled. For the CD frame sync pattern, "$100000000001000000000100_B$" (11T+11T+2T) not used as data and shown in FIG. 6a is used. The CD sync pattern shown as 6a is recorded in the CD in the form shown in FIGS. 6b or 6c.

Figure 7:
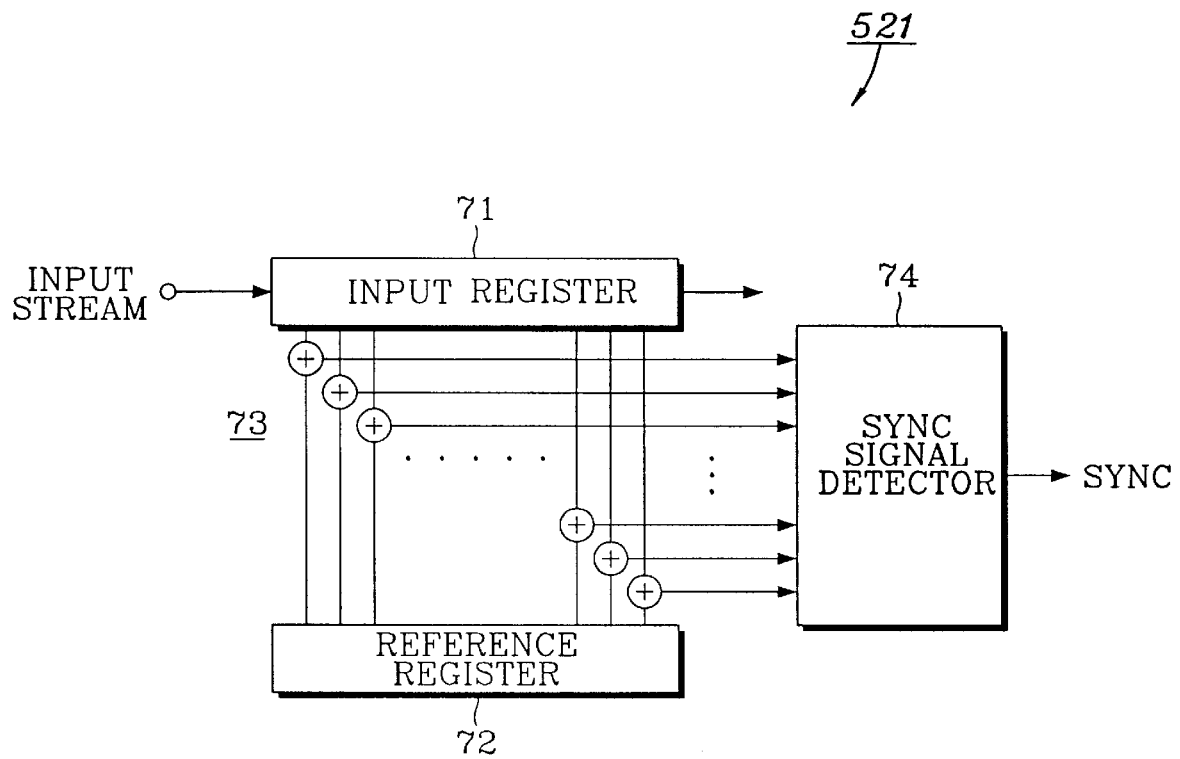
FIG. 7 is a block diagram of a device for detecting the CD frame sync signal according to the first embodiment of the present invention.

The format of data recorded on the CD is made as FIG. 6d. CD sync detector 521 is formed as in FIG. 7. Referring to FIG. 7, a data stream input is applied to input register 71 and shifted. Reference register 72 stores the CD frame sync pattern shown in FIG. 6a. Comparator 73 compares pieces of parallel output bit data of input register 71 and pieces of parallel output bit data of reference register 72, and outputs the result signal of comparison in units of bit. Sync signal detector 74 logically combines the bit data output from comparator 73, and generates a signal for deciding whether the CD sync signal is detected or not. Here, sync signal detector 74 uses a gate circuit. In case that HIGH logic signals are all output from comparator 73 in sync detection, sync signal detector 74 uses an AND gate. If the CD frame format is formed as shown in FIG. 6d, CD sync detector 521 detects a CD sync signal in the sync pattern cycle shown in FIG. 6e. The sync signal is generated in the cycle of 13.3 ms. The signal output from CD sync detector 521 formed as in FIG. 7 is applied to controller 511.

Controller 511 sets the CD mode as its initial mode if the disk is detected to be mounted. At a time point when the constant linear velocity (CLV) servo of the CD mode is ON, the frame sync signal of the reproducing system is produced in the cycle of 13.3 ms. More specifically, in case that data and their sync pattern are recorded on the CD as shown in FIG. 6d, the frame sync signal is detected in the cycle of 13.3 ms during playback, as mentioned above. The frame sync signal is generated from all the disks of CD and DVD. Here, the CLV servo is applied at a reference of 11T of the RF signal.

When controller 511 sets the CD mode as the initial operation mode, the CD sync pattern can be detected normally in case the mounted disk is a CD. However, if the DVD is mounted while the CD mode is set, the frame sync signal cannot be detected while the CLV servo is applied. In this embodiment, after the CLV servo is applied when the disk is mounted while the initial driving mode is a CD mode, it is determined whether the sync signal reproduced is detected or not, so as to decide whether the current mode is CD or DVD. According to the result decided, the CD or DVD reproducing mode is selectively driven.

Figure 8:
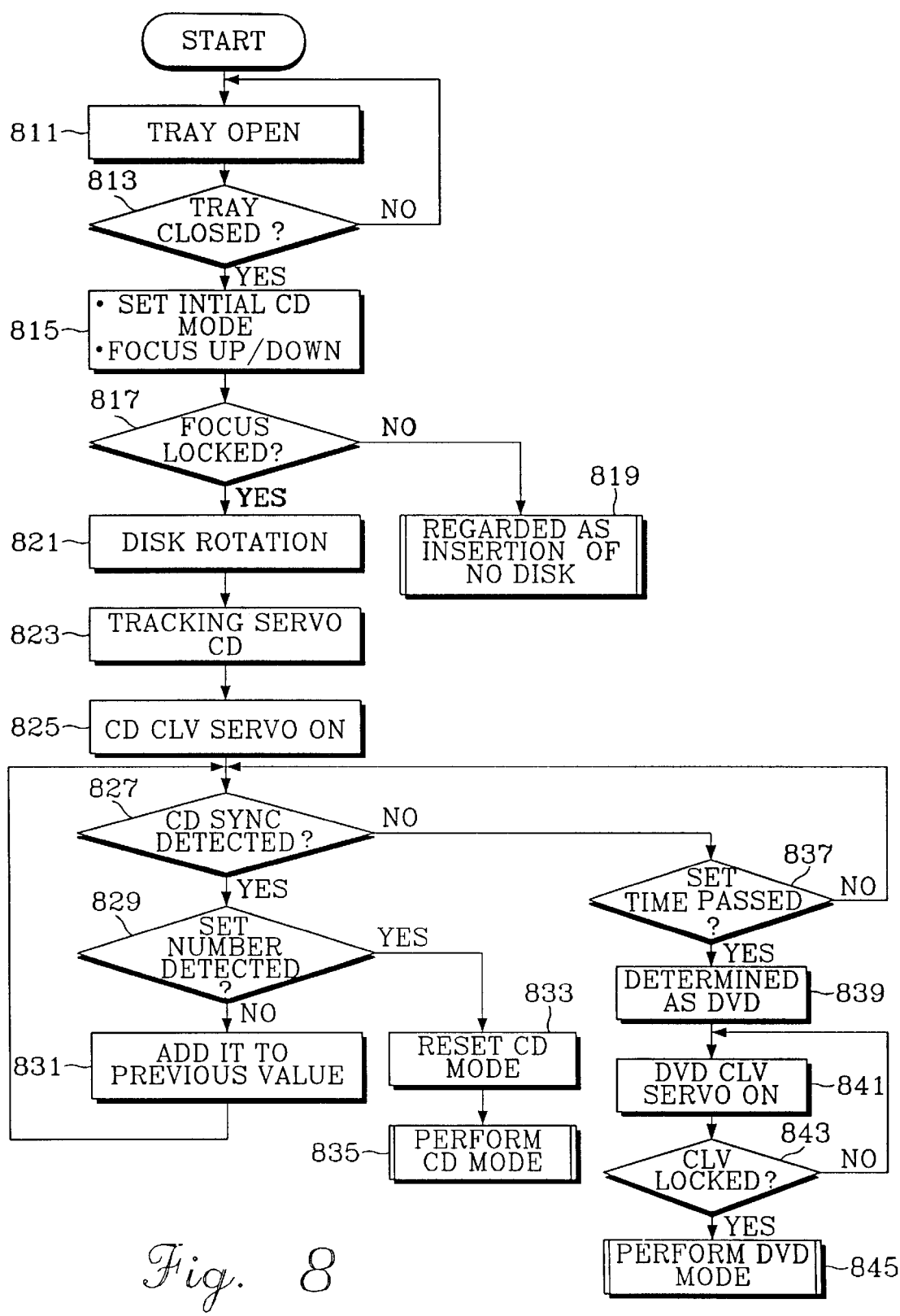
FIG. 8 shows a flowchart for explaining the operation of detecting the kind of disk mounted in the disk player according to the first embodiment.

FIG. 8 shows the procedure of selectively driving a corresponding playback mode by controller 511 detecting the kind of disk mounted. As shown in this figure, it is determined in this embodiment whether the CD frame sync signal is detected or not, after the CD mode is set as the initial playback mode when the disk is mounted. If the sync signal is detected according to the result, it is determined that the CD is mounted so that the CD reproducing system is selectively driven. If the sync signal is not detected for a predetermined time, it is determined that the DVD disk is mounted so that the DVD reproducing system is selectively driven.

Referring to FIG. 8, controller 511 checks whether any disk is mounted. First of all, controller 511 checks the state of input portion 510 to thereby find out the OPEN/CLOSED of the tray. If the tray is OPEN/CLOSED, controller 511 detects it in steps 811 and 813, and then decides that the disk is mounted. Thereafter, controller 511 controls a servo controller (not shown) in step 815 so as to perform the focusing of the optical pickup 111 focusing. Here, optical pickup 111 is a unit usable for both CD and DVD. Therefore, the servo controller drives optical pickup 111 as the CD pickup unit. Controller 511 raises or lowers the optical pickup 111's focusing in step 815, and checks in step 817 whether focus locking is performed. Here, if focus locking is not performed, controller 511 senses this situation in step 817, and decides in step 819 that the disk is not mounted. This case indicates that the tray is OPEN/CLOSED by a user while the disk is not mounted.

If focus locking is performed in step 817, this state indicates that the disk is mounted on the tray. In this case, controller 511 controls the servo controller through steps 821–825 so as to rotate the disk mounted and turn on the tracking servo and CLV servo. Here, the servo controller drives the spindle motor under the control of controller 511 to thereby rotate the disk. In addition, the tracking servo is performed so that optical pickup 111 accurately traces the tracks. If the tracking servo is finished, the rotation speed of the disk is controlled by manipulating the spindle motor in the CLV mode of the CD playback mode. This situation shows that the CLV mode of the CD playback mode is set during disk mounting and the detection of CD frame sync signal is prepared.

If the CD CLV servo is ON, controller 511 receives the output of CD sync detector 514 in step 827, and checks whether the CD frame sync signal is detected or not. Here, CD sync detector 521 receives the data stream filtered and equalized in the CD band, and the data stream input is compared with the previously stored CD frame sync pattern. Here, the CD frame sync pattern stored in reference register 72 is a peculiar pattern having a format different from the data recorded in the CD. CD sync detector 521 compares the sync pattern with the data stream received so that the pattern having the same value is output as the CD frame sync signal.

If the disk mounted is CD, the sync signal output from CD sync detector 521 is generated in the cycle of 13.3 ms, as shown in FIG. 6e. Controller 511 senses in step 827 that the CD frame sync signal is detected. The sync signal is detected for a predetermined number of times through steps 829 and 831. The number of detections of the CD frame sync signal is set to be high enough to decide that the disk mounted is a CD. If the CD frame sync signal is detected as many times as the predetermined number, controller 511 establishes optical pickup 111 as being for a CD in step 833, and resets the CLV servo for CD playback. Then, in step 835, DVD signal processor 517 and A/V decoder 518 are controlled to thereby inactivate the DVD playback system, and CD signal processor 514 and audio processor 515 are controlled to thereby activate the CD playback system. By doing so, the CD playback mode is performed.

However, if the CD frame sync signal is not detected in step 827, controller 511 checks in step 837 whether a predetermined time passes. This means that the detection of the CD frame sync signal is performed for the predetermined time even when the disk mounted is a DVD. Controller 511 waits to detect the CD frame sync signal for the predetermined time after the CD CLV servo is ON. If the sync signal is not detected for this time, the disk mounted is decided to be a DVD. The predetermined time is a period in which several CD frame sync signals can be detected. If the CD frame sync signal is not received for the predetermined time, controller 511 senses this state in step 837, and decides in step 839 that the disk mounted is a DVD. In step 841 optical pickup 111 is set for a DVD, and the DVD CLV servo is ON. If the CLV is locked thereafter, controller 511 senses it in step 843, and in step 845 CD signal processor 514 and audio processor 515 are OFF to stop the operation of the CD playback system. The DVD signal processor 517 and A/V decoder 518 are activated to drive the DVD playback system and perform the DVD playback mode.

In the first embodiment described as above, the CD playback mode is first performed when the disk is mounted in a disk playback system for reproducing both the CD and DVD, to thereby check whether there is a CD frame sync signal of the disk. If the CD frame sync signal is detected, the disk mounted is detected to be a CD, and the CD playback system is activated to perform the CD playback mode. If not, the disk mounted is decided to be a DVD, and the DVD playback system is activated to perform the DVD playback mode.

Figure 9:
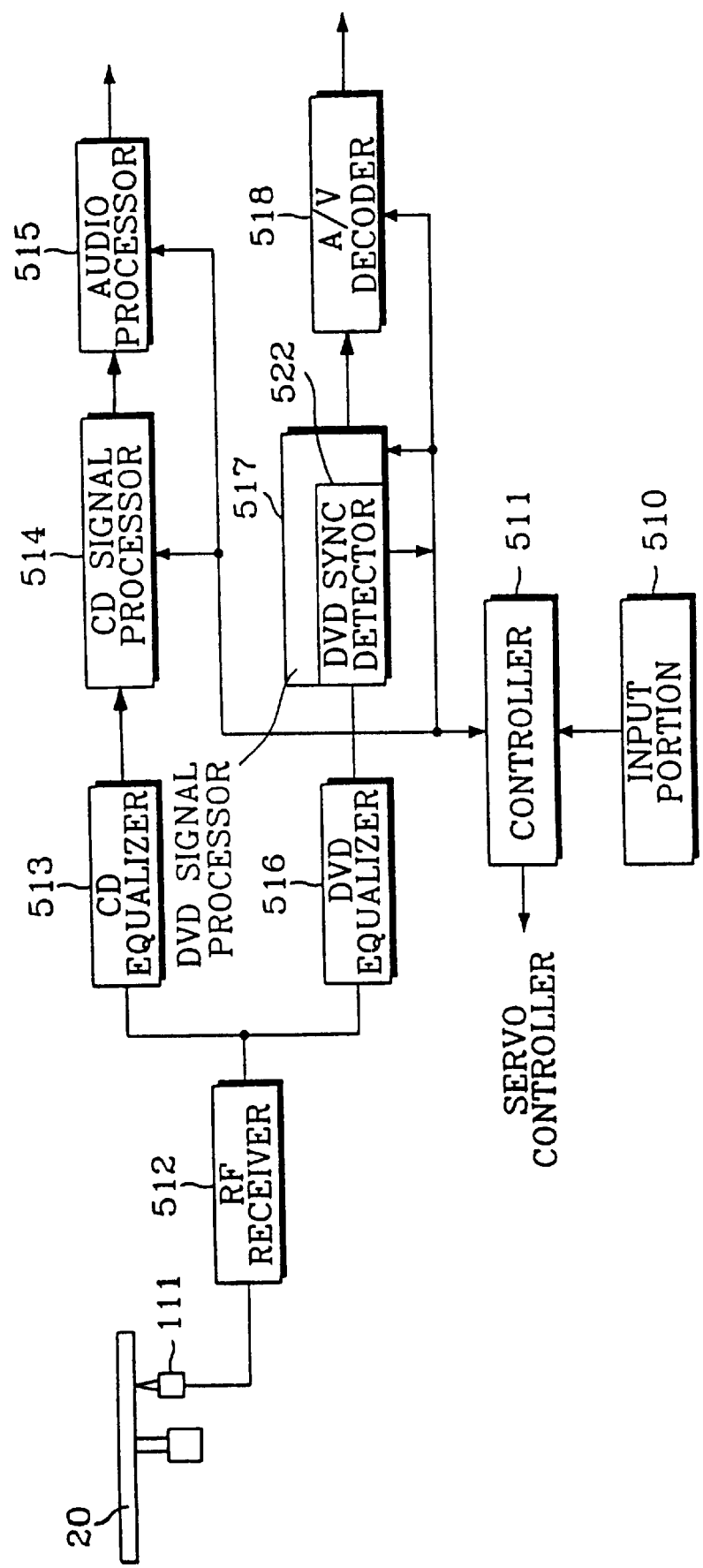
FIG. 9 is a block diagram of a device for detecting the kind of disk mounted in a disk player according to a second embodiment of the present invention.

FIG. 9 shows a configuration of automatically detecting the kinds of disks mounted in disk recording/reproducing system having CD and DVD reproducing systems according to a second embodiment of the present invention. It is assumed that optical pickup 111 uses a CD/DVD optical pickup unit. Radio frequency (RF) receiver 512 amplifies a weak light signal reproduced from optical pickup 111. Here, the RF signal output from RF receiver 512 is a signal reproduced from the CD or DVD.

First, in the CD reproducing system, CD equalizer 513 filters the CD band of the RF signal output from RF receiver 512, and equalizes it. CD signal processor 514 demodulates the data stream modulated and output from CD equalizer 513, and correct errors produced during the above procedure. Audio processor 515 signal processes the data output from CD signal processor 514.

Secondly in the DVD reproducing system, DVD equalizer 516 filters the DVD band of the RF signal received, and equalizes it. Here, the DVD band becomes a wide band containing the CD band. DVD signal processor 517 receives the DVD band of data stream output from DVD equalizer 516 to thereby demodulate the modulated data, and correct errors produced during the above procedure. DVD signal processor 517 corresponds to demodulator/ECC corrector 113 shown in FIG. 1. A/V decoder 518 splits the data output from DVD signal processor 517 into video data and audio data, and signal processes them. A/V decoder 518 corresponds to system decoder 116, video decoder 117 and audio decoder 119.

This second embodiment of the disk reproducing apparatus has CD and DVD reproducing systems. Optical pickup 111 is a unit capable of reproducing both a CD and a DVD. If a disk is mounted on the disk reproducing apparatus, it should be determined whether the disk mounted is a CD or a DVD, and then a corresponding reproducing system should be selectively driven. For this, DVD sync detector 522 is incorporated in DVD signal processor 517. Controller 511 decides the kind of the disk mounted and selectively drives a corresponding reproducing system, depending upon whether the DVD frame sync pattern output from DVD sync detector 522 is detected or not.

For the frame sync pattern of a DVD a pattern not produced from the modulated data is used. This ensures reliable synchronization unless bit errors are produced. The data recorded on a DVD uses EFM-plus modulation. In the DVD playback system using the EFM-plus modulation, the pattern of genuine data is maximum 11T ($10000000001_B$). Therefore, the DVD sync pattern commonly uses a pattern not used in the genuine data. In this case, such a pattern should surpass a minimum 12T. The DVD uses multiple sync patterns in combination in an appropriate way. Here, those sync patterns commonly have specific patterns not using the data pattern. It is assumed in this embodiment that the common pattern used in the sync pattern is 14T. The common pattern is assumed to be located at the lower 14 bits of each of the sync patterns.

Figure 10:
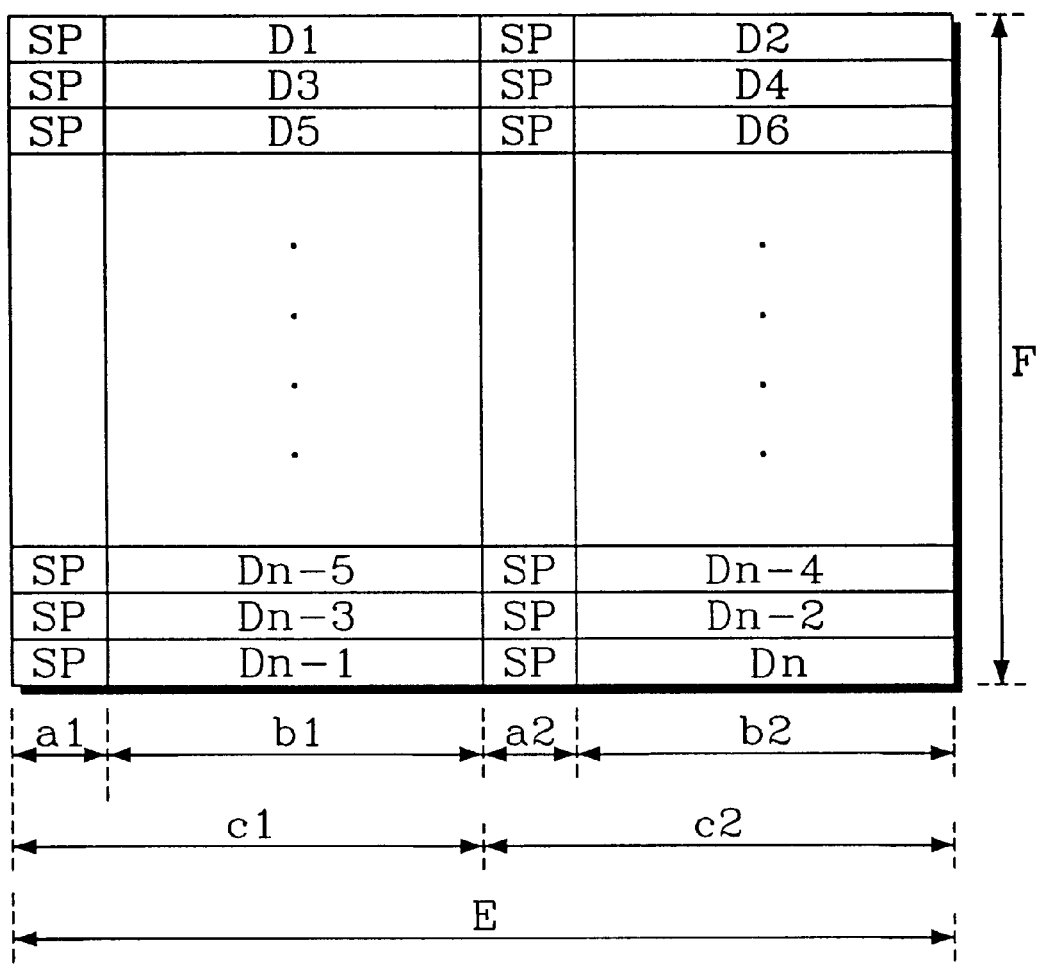
FIG. 10 is a diagram for showing an example of a DVD sync pattern according to the second embodiment of the present invention.

FIG. 10 shows an example in which the DVD's sync pattern and pieces of data are stored in one sector format. In FIG. 10, reference characters S indicate the sync patterns, D1-D being genuine data. Reference characters a1-a2 represent the length of a sync pattern, b1-b2 being the length of data. Reference characters c1-c2 indicate the length of a sync frame. Reference character E represents the length of two sync frames. Here, the data length b is far longer than the sync pattern length a. Reference character F indicates the number of rows of two frame syncs forming the sector. It is therefore noted that the size of one DVD sector becomes $$F*E=(c_1+c_2)*F=\{(a_1+b_1)+(a_2+b_2)\}*F$$

The sector format recorded in the DVD becomes as shown in FIG. 10. In this format, the sync pattern is formed as shown in FIG. 11a. Here, the sync pattern is formed with bits a, and the lower bits of the sync pattern have 14T commonly. The lower 14 bits of multiple sync patterns used in the DVD have the same value. Their upper bits have different values. As shown in FIGS. 11b and 11c of the data transfer time between the DVD frame sync patterns becomes 1.2 ms.

Figure 11:
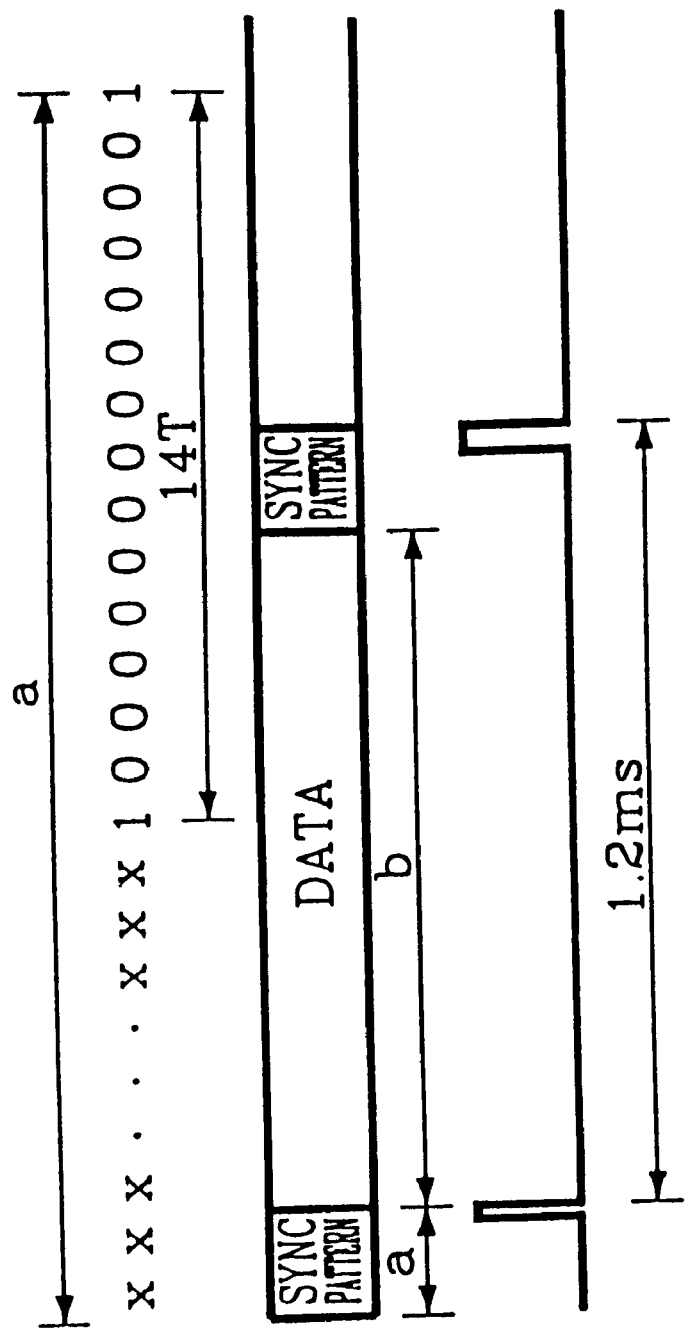
FIGS. 11A–11C show the characteristics of detecting a DVD frame sync signal in order to detect the kind of disk according to the second embodiment.

DVD sync detector 522 for detecting the DVD frame sync patterns shown in FIGS. 10 and 11 can be implemented in the same configuration as CD sync detector 521 shown in FIG. 7. In this case reference register 82 of DVD sync detector 522 stores pieces of lower 14 bit data having a common value in the DVD frame patterns, as shown in FIG. 11a. Comparator 73 compares pieces of parallel output playback data stream of input register 71 and the DVD frame sync pattern of reference register 72, and outputs the result signal of comparison in units of bit. Sync signal detector 74 logically combines the bit data output from comparator 73, and generates a signal for deciding whether the DVD sync signal is detected or not.

If the DVD sector format is formed as in FIG. 10, DVD sync detector 522 detects a DVD frame sync signal in the sync pattern cycle shown in FIG. 11c. The DVD frame sync pattern is reproduced in the cycle of 1.2 ms. DVD sync detector 521 detects the DVD frame sync signal, and outputs it to controller 511. Controller 511 sets the DVD mode as its initial mode if the disk is detected to be mounted. When the constant linear velocity (CLV) servo of the DVD mode is ON, and if the disk mounted is a DVD where data and sync patterns are recorded as shown in FIG. 10, controller 511 receives the DVD frame sync signal in the cycle of 1.2 ms.

When controller 511 sets the DVD mode as the initial operation mode, the DVD sync pattern can be detected normally in case that the disk is a mounted DVD. However, if the CD is mounted while the DVD mode is set, the frame sync signal cannot be detected while the CLV servo is applied. In this embodiment, after the CLV servo is applied when the disk is mounted while the initial driving mode is a DVD mode, it is determined whether the sync signal reproduced is detected or not, so as to decide whether the current mode is CD or DVD. According to the result decided, the CD or DVD reproducing mode is selectively driven.

Figure 12:
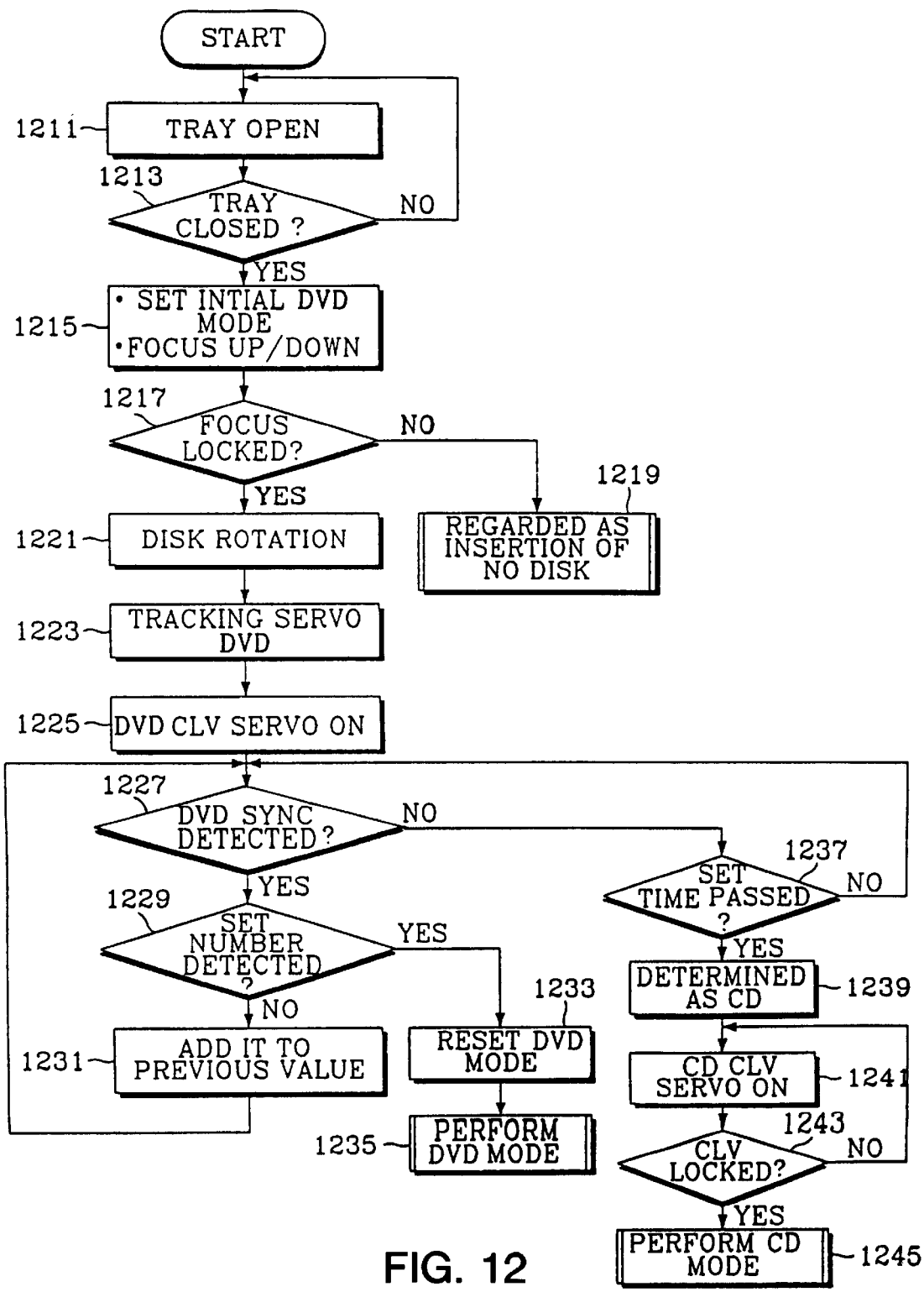
FIG. 12 shows a flowchart for explaining the operation of detecting the kind of disk mounted in the disk player according to the second embodiment.

FIG. 12 shows the procedure of selectively driving a corresponding playback mode by controller 511 detecting the kind of disk mounted according to the second embodiment. As shown in this figure, it is determined in this second embodiment whether the DVD frame sync signal is detected or not, after the DVD mode is set as the initial playback mode when the disk is mounted. If the sync signal is detected according to the result, it is determined that the DVD is mounted so that the DVD reproducing system is selectively driven. If the sync signal is not detected for a predetermined time, it is determined that the CD disk is mounted so that the CD reproducing system is selectively driven.

Referring to FIG. 12, controller 511 checks whether any disk is mounted. First of all, controller 511 checks the state of input portion 510 to thereby find out the OPEN/CLOSED of the tray. If the tray is OPEN/CLOSED, controller 511 detects it in steps 1211 and 1213, and then decides that the disk is mounted. Thereafter, controller 511 controls a servo controller (not shown) in step 1215 so as to perform the focusing of the optical pickup 111 focusing. Here, optical pickup 111 is a unit usable for both a CD and a DVD. Therefore, the servo controller drives optical pickup 111 as the CD pickup unit. Controller 511 raises or lowers the optical pickup 111's focusing in step 1215, and checks in step 1217 whether focus locking is performed. Here, if focus locking is not performed, controller 511 senses this situation in step 1217, and decides in step 1219 that the disk is not mounted. This case indicates that the tray is OPEN/CLOSED by a user while the disk is not mounted.

If focus locking is performed in step 1217, this state indicates that the disk is mounted on the tray. In this case controller 511 controls the servo controller through steps 1221–1225 so as to rotate the disk mounted and turn on the tracking servo and CLV servo. Here, the servo controller drives the spindle motor under the control of controller 511 to thereby rotate the disk. In addition, the tracking servo is performed so that optical pickup 111 accurately traces the tracks. If the tracking servo is finished, the rotation speed of disk is controlled by manipulating the spindle motor in the CLV mode of the DVD playback mode. This situation shows that the CLV mode of the DVD playback mode is set during disk mounting and the detection of a DVD frame sync signal is prepared.

If the DVD CLV servo is ON, controller 511 receives the output of DVD sync detector 522 in step 1227, and checks whether the DVD frame sync signal is detected or not. Here, DVD sync detector 522 receives the data stream filtered and equalized in the DVD band, and the data stream input is compared with the previously stored DVD frame sync pattern. Here, the DVD frame sync pattern commonly has the reference data stored in reference register 72, and is a peculiar pattern (14T) having a format different from the data recorded in the DVD. DVD sync detector 522 compares the sync pattern with the data stream received so that the pattern having the same value is output as the DVD frame sync signal.

If the disk mounted is a DVD, the sync signal output from DVD sync detector 522 is generated in the cycle of 1.2 ms, as in FIG. 11c. Controller 511 senses in step 1227 that the DVD frame sync signal is detected. The sync signal is detected for a predetermined number of times through steps 1229 and 1231. The number of detections of the DVD frame sync signal is set to be high enough to decide that the disk mounted is a DVD. If the DVD frame sync signal is detected as many times as the predetermined number, controller 511 establishes optical pickup 111 as being for a DVD in step 1233, and resets the CLV servo for DVD playback. Then, in step 1235, DVD signal processor 517 and A/V decoder 518 are controlled to thereby activate the DVD playback system, and CD signal processor 514 and audio processor 515 are controlled to thereby inactivate the CD playback system. By doing so, the DVD playback mode is performed for example, herein, if the number of times the frame sync signal is detected is set to three times, five by five, it can be confidentially decided that the disk mounted is a DVD.

However, if the DVD frame sync signal is not detected in step 1227, controller 511 checks in step 1237 whether a predetermined time passes. This means that the detection of the DVD frame sync signal is performed for the predetermined time even when the disk mounted is a CD. Controller 511 waits to detect the DVD frame sync signal for the predetermined time after the DVD CLV servo is ON. If the sync signal is not detected for this time, the disk mounted is decided to be a CD. The predetermined time is a period in which several DVD frame sync signals can be detected. If the DVD frame sync signal is not received for the predetermined time, controller 511 decides in step 1239 that the disk mounted is a CD. In step 1241 optical pickup 111 is set for a CD, and the CD CLV servo is ON. If the CLV is locked thereafter, controller 511 senses it in step 1243, and in step 1245, CD signal processor 514 and audio processor 515 are ON to activate the operation of the CD playback system. The DVD signal processor 517 and A/V decoder 518 are inactivated for drive of the DVD playback system, and the CD playback mode is performed.

In the second embodiment described as above, the DVD playback mode is first performed when the disk is mounted in a disk playback system for reproducing both a CD and a DVD, to thereby check whether there is a DVD frame sync signal of the disk. If the DVD frame sync signal is detected, the mounted disk is detected to be a DVD, and the DVD playback system is activated to perform the DVD playback mode. If not, the disk mounted is decided to be CD, and the CD playback system is activated to perform the CD playback mode.

Figure 13:
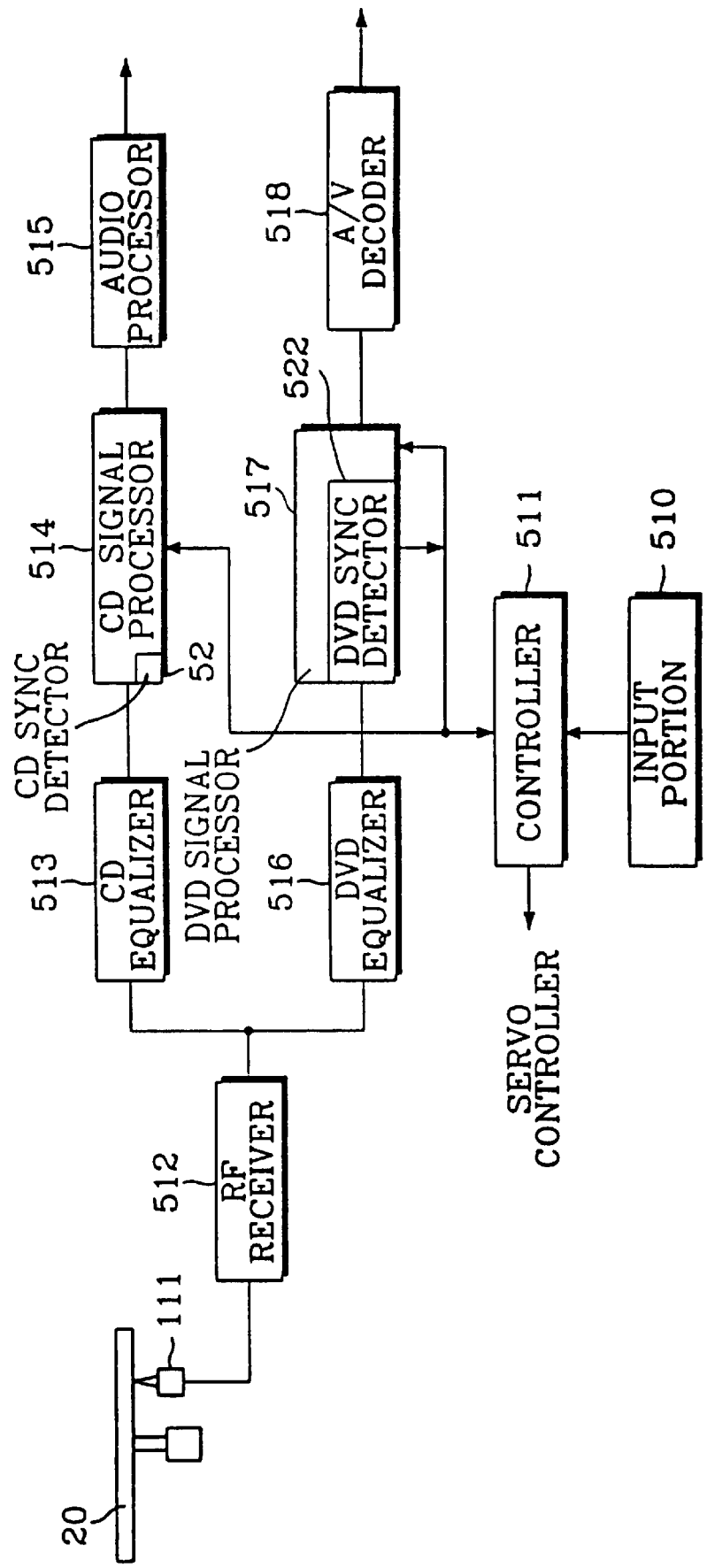
FIG. 13 is a block diagram of a device for detecting the kind of disk mounted in a disk player according to a third embodiment of the present invention.

FIG. 13 shows a configuration of automatically detecting the kinds of disks mounted in a disk recording/reproducing system having CD and DVD reproducing systems according to a third embodiment of the present invention. It is assumed that optical pickup 111 uses CD/DVD optical pickup unit. Radio frequency (RF) receiver 512 amplifies a weak light signal reproduced from optical pickup 111. Here, the RF signal output from RF receiver 512 is a signal reproduced from the CD or DVD.

First, in the CD reproducing system, CD equalizer 513 filters the CD band of the RF signal output from RF receiver 512, and equalizes it. CD signal processor 514 demodulates the data stream modulated and output from CD equalizer 513, and corrects errors produced during the above procedure. Audio processor 515 signal processes the data output from CD signal processor 514.

Secondly, in the DVD reproducing system, DVD equalizer 516 filters the DVD band of the RF signal received, and equalizes it. Here, the DVD band becomes a wide band containing the CD band. DVD signal processor 517 receives the DVD band of data stream output from DVD equalizer 516 to thereby demodulate the modulated data, and correct errors produced during the above procedure. DVD signal processor 517 corresponds to demodulator/ECC corrector 113 shown in FIG. 1. A/V decoder 518 splits the data output from DVD signal processor 517 into video data and audio data, and signal processes them. A/V decoder 518 corresponds to system decoder 116, video decoder 117 and audio decoder 119.

This third embodiment of the disk reproducing apparatus has CD and DVD reproducing systems. Optical pickup 111 is a unit capable of reproducing both a CD and a DVD. If a disk is mounted on the disk reproducing apparatus, it should be determined whether the disk mounted is a CD or a DVD, and then a corresponding reproducing system should be selectively driven. For this, CD sync detector 521 is built in CD signal processor 514, and DVD sync detector 522 is incorporated in DVD signal processor 517. Controller 511 decides the kind of the disk mounted and selectively drives a corresponding reproducing system, depending upon whether the CD or DVD frame sync pattern output from CD or DVD sync detector 521 or 522 is detected or not.

As explained above, CD and DVD have different frame sync patterns. For this reason, the disk reproducing system having CD and DVD playback systems can detect the kind of disk by checking the frame sync pattern recorded on the disk. Here, the CD frame sync pattern's characteristics are the same as those in the first embodiment of FIG. 6. The DVD frame sync pattern's characteristics are the same as those in the second embodiment of FIGS. 10 and 11a through 11c.

The CD sync detector 521 for detecting the CD frame sync pattern and the DVD sync detector 522 for detecting the DVD frame sync pattern can be constructed as in FIG. 7 according to the first and second embodiments. Here, reference register 72 of CD sync detector 521 stores the CD frame sync pattern as shown in FIG. 6a. Reference register 72 of DVD sync detector 522 stores the DVD frame sync pattern as shown in of FIG. 11a.

If the mounted disk is sensed initially, controller 511 sets its initial driving mode as CD or DVD mode. Here, if controller 511 sets the initial driving mode as CD mode, the CD frame sync pattern can be detected normally in case that the disk mounted is CD. However, if the DVD is mounted while the CD mode is set, the frame sync signal cannot be detected while the CLV servo is applied. In this case, controller 511 converts the initial operating mode into the DVD mode so that the DVD frame sync signal can be detected by DVD sync detector 522.

Reversely, if controller 511 sets the initial driving mode as DVD mode, the DVD frame sync pattern can be detected normally in case that the disk mounted is a DVD. However, if the CD is mounted while the DVD mode is set, the frame sync signal cannot be detected while the CLV servo is applied. In this case, controller 511 converts the initial operating mode into the CD mode so that the CD frame sync signal can be detected by CD sync detector 521.

In this third embodiment of the present invention, the initial operating mode is set as a CD mode when the disk is mounted, and then it is checked whether the CD frame sync pattern is detected or not. If the pattern is detected, the CD playback mode is performed continuously. If not, then the current mode is converted into the DVD mode to detect the DVD frame sync pattern and then is performed continuously the DVD playback mode.

Figure 14A:
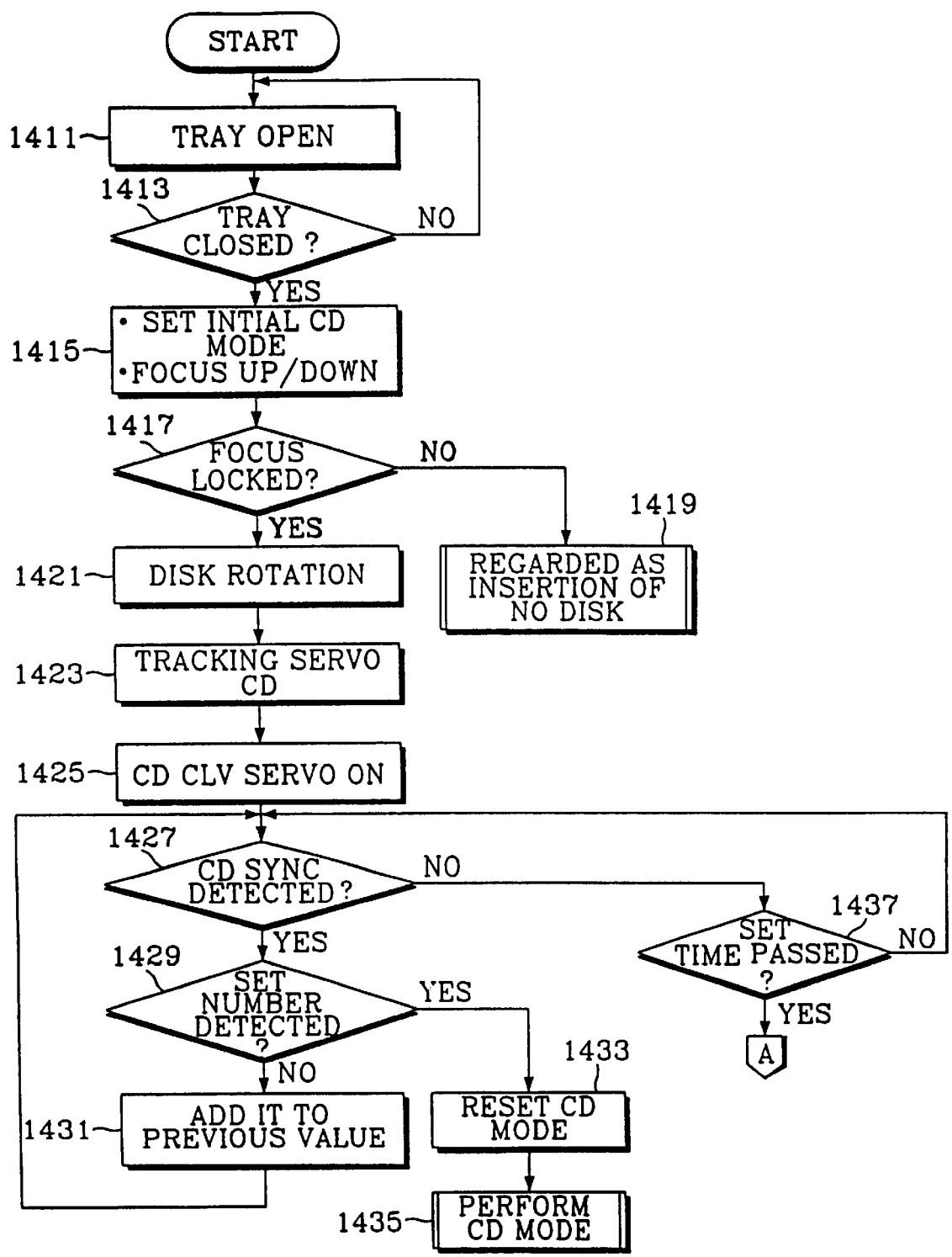
FIGS. 14A and 14B show a flowchart for explaining the operation of detecting the kind of disk mounted in the disk player according to the third embodiment.
Figure 14B:
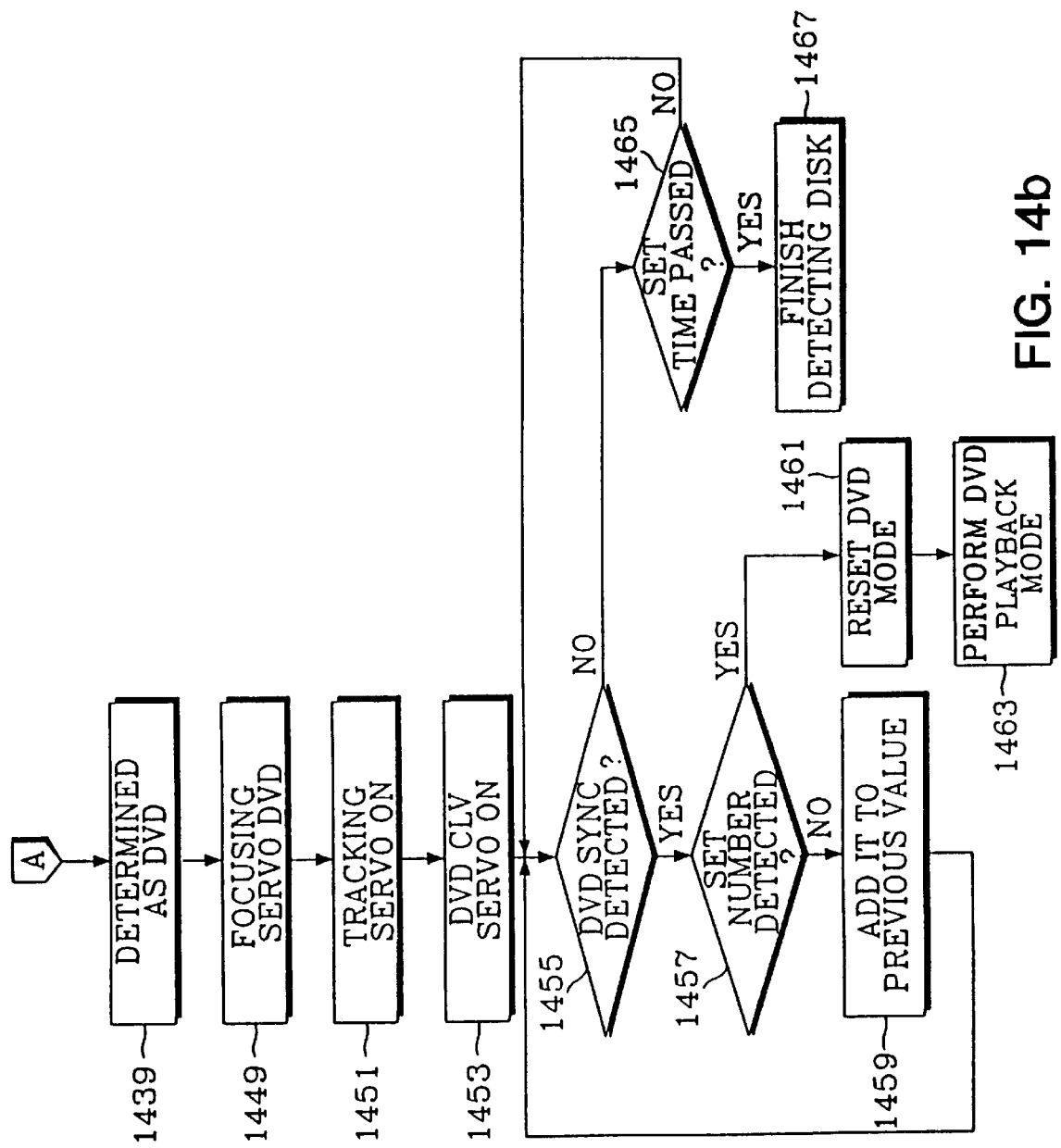

FIGS. 14a and 14b show a flowchart of the procedure of selectively driving a corresponding playback mode by controller 511 detecting the kind of disk when the disk is mounted, according to the third embodiment of the present invention.

Referring to FIG. 13, controller 511 detects the CD frame sync signal in the sequence of which are the same as corresponding steps 811–837 shown in FIG. 8, respectively, according to the first embodiment steps 1411–1435 of FIG. 14a. When the CD frame sync signal is detected, the CD playback system is selectively driven to perform the CD playback mode. First of all, if the disk is detected to be mounted, the CD playback mode is set as the initial driving mode and the output of CD sync detector 521 is analyzed. If the CD frame sync signal is detected, it is then determined that the disk mounted is CD, and the CD playback mode is performed.

If the CD frame sync signal is not received for a predetermined time in the state in which the CD playback mode is set as the initial driving mode, controller 511 senses it in step 1437 of FIG. 14a. Then, in step 1439 of FIG. 14b, the current mode is converted into the DVD mode so that optical pickup 111 is controlled to reproduce information recorded on the DVD. In step 1449, the focusing servo is turned on. Through steps 1451–1465, the DVD frame sync signal is detected and the DVD playback mode is performed, wherein these steps are the same as corresponding steps 1223–1237 shown in FIG. 12, respectively, according to the second embodiment.

In the third embodiment of the present invention, the CD playback mode is first performed to check whether the CD frame sync signal of the disk is detected or not, when the disk is mounted in the disk playback system capable of simultaneously reproducing a CD and a DVD. If the CD frame sync signal is not detected, the DVD frame sync signal is detected.

In another aspect of the present invention, the DVD playback mode is first performed to check whether the DVD frame sync signal of the disk is detected or not. If the DVD frame sync signal is not detected, the CD frame sync signal can be detected. In this situation, if the DVD frame sync signal is detected, the disk mounted is detected to be a DVD, and the DVD playback system is activated to perform the DVD playback mode. Here, if the DVD frame sync signal is not detected for a predetermined time, the DVD driving mode is converted into the CD mode, and then the CD frame sync signal is detected. By doing so, the disk mounted is determined to be a CD, and the CD playback system is activated to perform the CD playback mode.

In the first, second and third embodiments of the present invention, there has been explained a single pickup capable of reproducing both a CD and a DVD. However, the present invention can be applied equally to a disk playback system having a CD-only pickup and a DVD-only pickup separately. In this configuration, the data stream generated from the CD-only pickup is first analyzed when a disk is mounted, to thereby check whether the CD frame sync signal is detected or not. Here, if the CD frame sync signal is detected, the CD playback mode is performed. If the signal is not detected for a predetermined time, the DVD-only pickup is activated to select the DVD playback system and perform the DVD playback mode.

As described above, the present invention is capable of automatically detecting the kind of disk inserted into an apparatus for reproducing multiple disks. Especially, the sync signal of the disk mounted is detected to decide the kind of disk so that the kind of disk can be accurately detected. According to the result detected, a corresponding disk playback mode is automatically performed.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

We claim:

1. An optical disk reproducing apparatus having playback systems of CD and DVD containing respective sync signals, the optical disk reproducing apparatus comprising:

a controller; and the CD playback system including a CD sync detector;

wherein the controller initially sets the optimal disk reproducing apparatus to a CD playback mode, and then analyzes whether the CD sync detector detects a CD sync signal when a disk is detected to be mounted, the controller selectively driving the CD playback system when the CD sync signal is detected to perform the CD playback mode, and selectively driving the DVD playback system when the CD sync signal is not detected for a predetermined time to perform a DVD playback mode.

2. An optical disk reproducing apparatus having an optical pickup for a CD and a DVD having different sync signals, and also having CD and DVD playback systems, the optical disk reproducing apparatus comprising:

a controller; and the CD playback system including a CD sync detector;

wherein the controller controls the optical pickup for CD-only, initially sets the optical disk reproducing to a CD playback mode, and then analyzes whether the CD sync detector detects a CD sync signal when a disk is detected to be mounted, the controller selectively driving the CD playback system when the CD sync signal is detected to perform the CD playback mode, and controlling the optical pickup for DVD-only and selectively driving the DVD playback system when the CD sync signal is not detected for a predetermined time to perform a DVD playback mode.

3. A method of reproducing an optical disk reproducing apparatus having an optical pickup for a CD and a DVD having different sync signals, and also having CD and DVD playback systems, the CD playback system having a CD sync detector, the method comprising the steps of;

controlling the optical pickup for CD-only;

initially setting the optical disk reproducing apparatus to a CD playback mode, and then analyzing whether the CD sync detector detects a CD sync signal when a disk is detected to be mounted;

selectively driving the CD playback system when the CD sync signal is detected to perform the CD playback mode; and controlling the optical pickup for DVD-only and selectively driving the DVD playback system, when the CD sync signal is not detected for a predetermined time to perform a DVD playback mode.

4. An optical disk reproducing apparatus having playback systems of CD and DVD containing respective sync signals, the optical disk reproducing apparatus comprising:

a controller; and the DVD playback system including a DVD sync detector;

wherein the controller initially sets the optical disk reproducing apparatus to DVD playback mode, and then analyzes whether the DVD sync detector detects a DVD sync signal when a disk is detected to be mounted, the controller selectively driving the DVD playback system when the DVD sync signal is detected to perform the DVD playback mode, and selectively driving the CD playback system when the DVD sync signal is not detected for a predetermined time to perform a CD playback mode.

5. An optical disk reproducing apparatus having playback systems of CD and DVD containing respective sync signals, the optical disk reproducing apparatus comprising:

a controller; and the CD and DVD playback systems respectively including sync detectors;

wherein the controller analyzes a sync signal output from the sync detectors when a disk is detected to be mounted, selectively drives the CD playback system when a CD sync signal is detected to perform a CD playback mode, and selectively drives the DVD playback system when a DVD sync signal is detected to perform a DVD playback mode.

6. An optical disk reproducing apparatus having a double-focus optical pickup for CD and DVD having different sync signals, and also having CD and DVD playback systems, the optical disk reproducing apparatus comprising:

a controller; and the CD and DVD playback systems respectively including sync detectors;

wherein the controller controls the optical pickup for CD-only and analyzes whether the CD sync detector detects a CD signal when a disk is detected to be mounted, the controller selectively driving the CD playback system when the CD sync signal is detected to perform a CD playback mode, and the controller controlling the optical pickup for DVD-only and analyzes whether the DVD sync detector detects a DVD sync signal when a disk is detected to be mounted, the controller selectively driving the DVD playback system when the DVD sync signal is detected to perform a DVD playback mode, and the controller controlling the optical pickup for CD-only and selectively driving the CD playback system when the CD sync signal is detected to perform a CD playback mode.

7. An optical disk reproducing apparatus having a double-focus optical pickup for CD and DVD having different sync signals, and also having CD and DVD playback systems, the optical disk reproducing apparatus comprising:

a controller; and the CD and DVD playback systems respectively including sync detectors, wherein the controller controls the optical pickup for DVD-only and analyzes whether the DVD sync detector detects DVD sync signal when a disk is detected to be mounted, the controller selectively driving the DVD playback system when the DVD sync signal is detected to perform a DVD playback mode, and the controller controlling the optical pickup for CD-only and selectively driving the CD playback system when the CD sync signal is detected to perform a CD playback mode.

8. An optical disk reproducing apparatus having a double-focus optical pickup for CD and DVD having different sync signals, and also having CD and DVD playback systems, the optical disk reproducing apparatus comprising:

a controller; and the CD and DVD playback systems respectively including sync detectors;

wherein the controller analyzes a sync signal output from the sync detectors when a disk is detected to be mounted, the controller selectively driving the CD playback system when a CD sync signal is detected to perform a CD playback mode, and selectively driving the DVD playback system when a DVD sync signal is detected to perform a DVD playback mode.

9. An optical disk reproducing apparatus having playback system of CD and DVD containing respective sync signals, to reproduce data from a disk mounted in the optical disk reproducing apparatus, the optical disk reproducing apparatus comprising:

a controller; and one of the CD and DVD playback systems including a corresponding sync detector;

wherein the controller initially sets a first playback mode corresponding to the one of the CD and DVD playback systems including the corresponding sync detector, and subsequently analyzes whether the sync detector detects a corresponding one of the sync signals when the disk is mounted detected to be mounted, the controller selectively driving the one of the CD and DVD playback systems including the corresponding sync detector when the corresponding one of the sync signals is detected to perform the first playback mode, the controller selectively driving the other one of the CD and DVD playback systems when the one sync signal is not detected for a predetermined time to perform a second playback mode.

10. An optical disk reproducing apparatus as claimed in claim 9, wherein said sync detector comprises:

an input register to shift the data from the mounted disk;

a reference register to store a reference frame sync pattern;

a comparator to compare bits of the shifted data with bits of the reference frame sync pattern, to generate comparison results; and a sync signal detector to logically combine the comparison results to determine whether the sync signal occurs in the data from the mounted disk.

11. An optical disk reproducing apparatus as claimed in claim 9, further comprising:

an optical pickup;

wherein the controller raises or lowers the optical pickup relative to the mounted disk to perform focus locking prior to initially setting the first playback mode.

12. An optical disk reproducing apparatus having playback system of CD and DVD containing respective sync signals, to reproduce data from a disk mounted in the optical disk reproducing apparatus, the optical disk reproducing apparatus comprising:

a controller; and the CD and DVD playback systems including respective sync detectors;

wherein the controller initially sets a first playback mode corresponding to the one of the CD and DVD playback systems, and subsequently analyzes whether a first one of the sync detectors detects a first one of the sync signals when the disk is mounted detected to be mounted, the controller selectively driving the one of the CD and DVD playback systems including the first one of the sync detectors when the first one of the sync signals is detected to perform the first playback mode, the controller then analyzing whether a second one of the sync detectors detects a second one of the sync signals if the first one of the sync detectors does not detect the first one of the sync signals, and selectively driving the other one of the CD and DVD playback systems when the second one of the sync signals is detected to perform a second playback mode.

13. An optical disk reproducing apparatus as claimed in claim 12, wherein each of said sync detectors comprises:

an input register to shift the data from the mounted disk;

a reference register to store a reference frame sync pattern;

a comparator to compare bits of the shifted data with bits of the reference frame sync pattern, to generate comparison results; and a sync signal detector to logically combine the comparison results to determine whether the sync signal occurs in the data from the mounted disk.

14. An optical disk reproducing apparatus as claimed in claim 12, further comprising:

an optical pickup;

wherein the controller raises or lowers the optical pickup relative to the mounted disk to perform focus locking prior to initially setting the first playback mode.

* * * * *

UNITED STATES PATENT AND TRADEMARK OFFICE
CERTIFICATE OF CORRECTION

PATENT NO. : 5,963,705
DATED : October 5, 1999
INVENTOR(S) : Young-Han KIM et al.

It is certified that error appears in the above-identified patent and that said Letters Patent is hereby corrected as shown below:

On the Title Page:

[56]  References Cited

U.S. PATENT DOCUMENTS

"5,522,575   6/1996 Okamoto ................................. 386/126" should be
--5,225,755  7/1993 Okamoto ................................. 318/685--.

Column 13, line 67    insert --apparatus-- after "producing".

Signed and Sealed this

Fifth Day of September, 2000

Attest:

Q. TODD DICKINSON

Attesting Officer

*Director of Patents and Trademarks*